(12) United States Patent
Sylvester et al.

(10) Patent No.: US 12,331,860 B2
(45) Date of Patent: Jun. 17, 2025

(54) CABLE CLAMP WITH ADJUSTMENT LATCHES

(71) Applicant: Panduit Corp., Tinley Park, IL (US)

(72) Inventors: David J. Sylvester, Manhattan, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/605,028

(22) Filed: Mar. 14, 2024

(65) Prior Publication Data

US 2024/0218943 A1 Jul. 4, 2024

Related U.S. Application Data

(63) Continuation of application No. 17/890,471, filed on Aug. 18, 2022, now Pat. No. 11,959,571.

(51) Int. Cl.
*F16L 3/10* (2006.01)
*F16L 3/22* (2006.01)

(52) U.S. Cl.
CPC ............ *F16L 3/1033* (2013.01); *F16L 3/222* (2013.01)

(58) Field of Classification Search
CPC ....... F16L 3/1041; F16L 3/222; F16L 3/1025; F16L 3/10; F16L 3/1033
See application file for complete search history.

(56) References Cited

U.S. PATENT DOCUMENTS

| 631,234 A | 8/1899 | Stevens |
| 2,355,742 A | 8/1944 | Morehouse |
| 3,564,676 A | 2/1971 | Oeser |
| 3,729,572 A * | 4/1973 | Helin ............ H02G 3/14 220/3.6 |
| 3,856,244 A | 12/1974 | Menshen |
| 4,037,810 A | 7/1977 | Pate |

(Continued)

FOREIGN PATENT DOCUMENTS

| AT | 14217 U1 | 6/2015 |
| CN | 103162016 A | 6/2013 |

(Continued)

OTHER PUBLICATIONS

Hellermann Tyton Clamp Bundle Separator Two Hole Part No. 133-00993 Specification sheet; 4 pages; 2002; retrieved from internet Jan. 18, 2022.

(Continued)

*Primary Examiner* — Christopher Garft
(74) *Attorney, Agent, or Firm* — Aimee E. McVady; Christopher S. Clancy; James H. Williams

(57) ABSTRACT

Two identical cradle halves joined together to form a cable clamp that secures at least one cable to a surface. Each cradle half has a front, a back, a top, a bottom, and sides. Each cradle half has at least one cradle portion with a compression insert and an attachment portion. The attachment portion has an adjustment latch with a post having a T-shaped head and a tapered adjustment slot. The cable clamp is formed by joining the two cradle halves with the top of one cradle half positioned on the top of a second cradle half. The cradle portion and the attachment portion of one cradle half is positioned over the cradle portion and the attachment portion of the second cradle half to form the cable clamp.

10 Claims, 12 Drawing Sheets

(56) References Cited

U.S. PATENT DOCUMENTS

| | | | |
|---|---|---|---|
| 4,099,626 A * | 7/1978 | Magnussen, Jr. | A47B 63/02 |
| | | | 248/68.1 |
| 4,114,241 A * | 9/1978 | Bisping | F16L 3/13 |
| | | | 248/68.1 |
| 4,131,257 A | 12/1978 | Sterling | |
| 4,199,070 A * | 4/1980 | Magnussen, Jr. | A47B 73/006 |
| | | | 248/68.1 |
| 4,385,695 A | 5/1983 | Champlin et al. | |
| 5,201,484 A | 4/1993 | Thoen | |
| 5,794,897 A | 8/1998 | Jobin et al. | |
| 5,937,488 A | 8/1999 | Geiger | |
| 5,941,483 A | 8/1999 | Baginski | |
| 6,079,673 A * | 6/2000 | Cox | F16L 3/1041 |
| | | | 174/40 R |
| 6,536,982 B2 | 3/2003 | Gibbons et al. | |
| 6,561,466 B1 | 5/2003 | Myers et al. | |
| 8,702,044 B2 * | 4/2014 | Railsback | F16L 3/237 |
| | | | 248/65 |
| 8,708,289 B2 | 4/2014 | Allenbach et al. | |
| 8,770,537 B2 | 7/2014 | Go | |
| 8,919,717 B2 | 12/2014 | Hauser | |
| 9,080,698 B2 | 7/2015 | Fukumoto | |
| 9,601,241 B2 | 3/2017 | Dannenberg | |
| 10,012,330 B1 | 7/2018 | Thomas et al. | |
| 10,094,491 B1 | 10/2018 | Crounse et al. | |
| 10,378,679 B2 | 8/2019 | Booth et al. | |
| 10,411,452 B2 | 9/2019 | Varale | |
| 10,703,311 B2 | 7/2020 | Davenport et al. | |
| 10,941,882 B1 * | 3/2021 | Rhysing | F16L 3/1091 |
| 11,280,431 B2 | 3/2022 | Rhysing | |
| D948,981 S | 4/2022 | Van Hulst et al. | |
| 11,329,466 B2 | 5/2022 | Vaccaro | |
| 11,641,095 B2 * | 5/2023 | Hüppi-Ziegler | H02G 3/0406 |
| | | | 248/68.1 |
| 2007/0267866 A1 * | 11/2007 | Jolly | F16L 3/2235 |
| | | | 285/207 |
| 2007/0278357 A1 | 12/2007 | Pizzi | |
| 2009/0140106 A1 | 6/2009 | Johnson et al. | |
| 2012/0153095 A1 | 6/2012 | Child et al. | |
| 2022/0065274 A1 | 3/2022 | Seki | |
| 2022/0094148 A1 * | 3/2022 | Hüppi-Ziegler | H02G 3/32 |
| 2022/0118585 A1 * | 4/2022 | de Lint | B25B 5/147 |

FOREIGN PATENT DOCUMENTS

| | | |
|---|---|---|
| EP | 2003383 A2 | 12/2008 |
| EP | 1886055 B1 | 7/2010 |
| EP | 3550194 A1 | 10/2019 |
| EP | 3670985 A1 | 6/2020 |
| EP | 3327326 B1 | 8/2020 |
| ES | 2235657 A1 | 7/2005 |
| GB | 2101666 A | 1/1983 |
| GB | 2367695 B | 4/2002 |
| GB | 2574840 B | 10/2020 |
| JP | 2014138517 A | 7/2014 |

OTHER PUBLICATIONS

Hellermann Tyton Clamp Bundle Separator Three Hole Part No. 133-00998 Specification sheet; 3 pages; 2002; retrieved from internet Jan. 18, 2022.

Hellermann Tyton Part No. DHVC10-12-PA6GF30/TPV-BK detail sheets; 3 pages; retrieved from internet on Jun. 14, 2022.

* cited by examiner

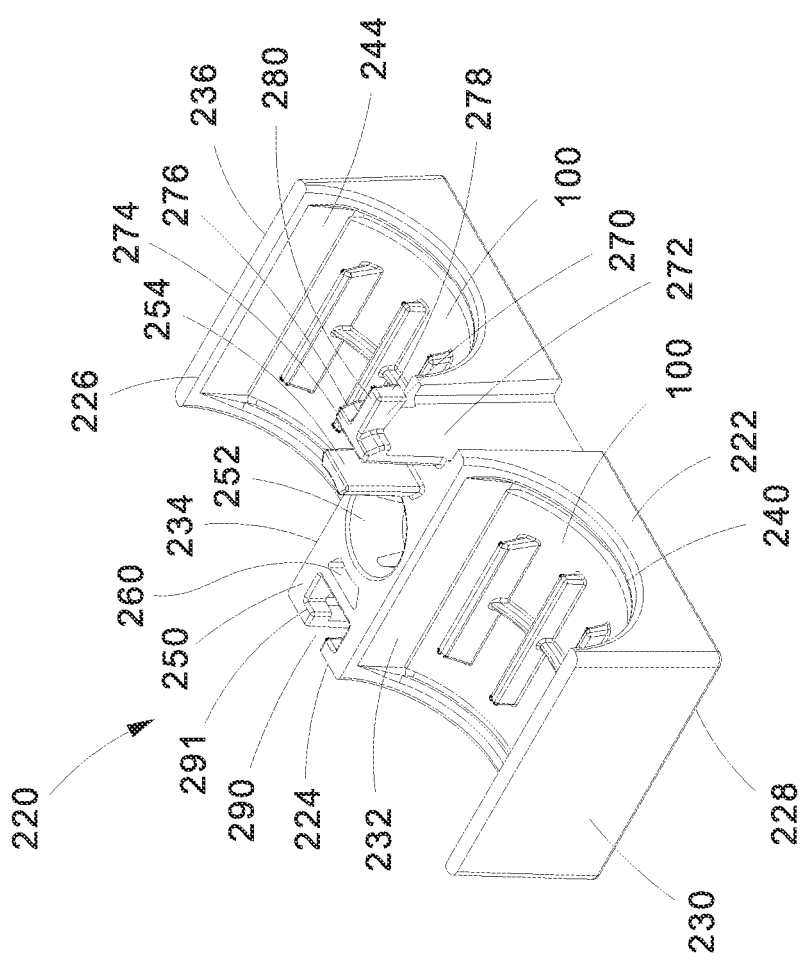
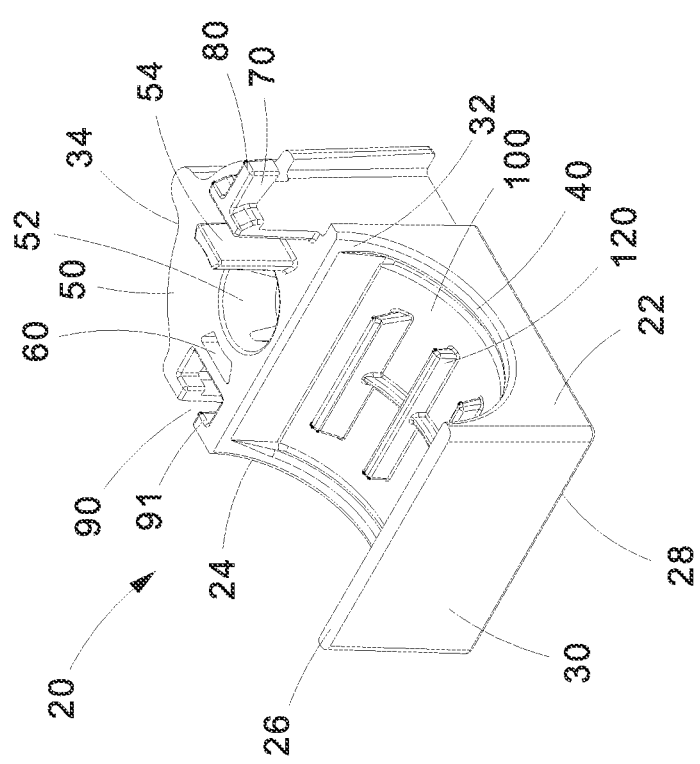

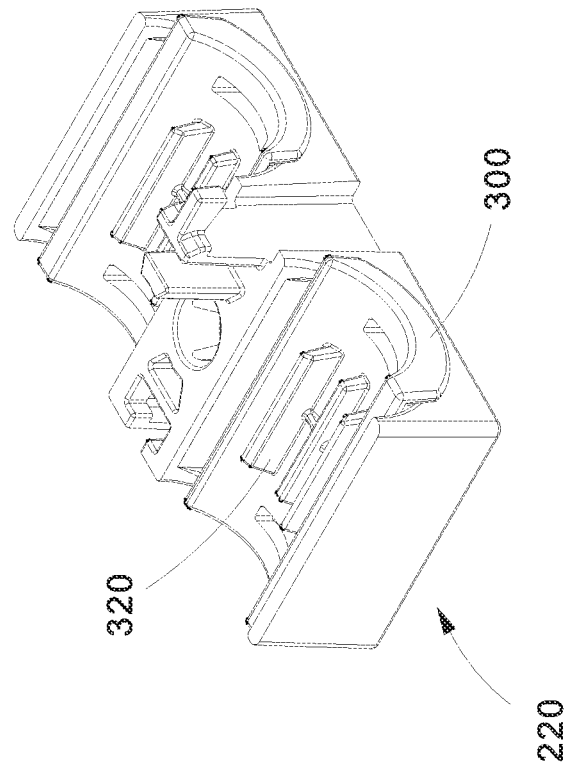
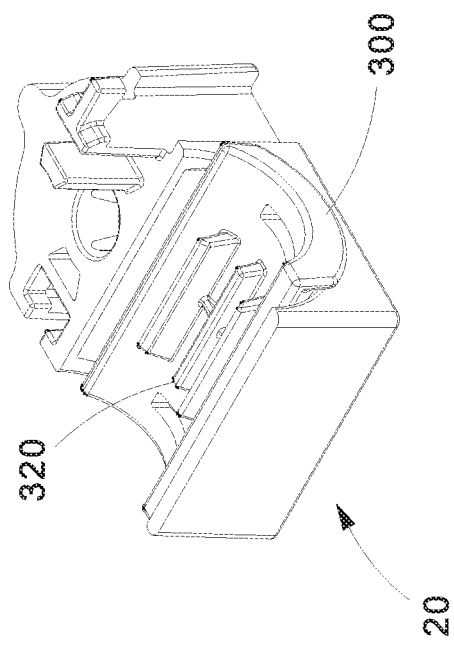
Fig.12b
Fig.12a

CABLE CLAMP WITH ADJUSTMENT LATCHES

CROSS REFERENCE TO RELATED APPLICATION(S)

This application is a continuation of U.S. patent application Ser. No. 17/890,471, filed on Aug. 18, 2022, the entirety of which is hereby incorporated by reference herein.

FIELD OF THE INVENTION

The present invention relates to a cable clamp, and more particularly to a cable clamp with adjustment latches.

BACKGROUND OF THE INVENTION

It is known to use cable clamps in the heavy-duty trucking industry. The cable clamps must hold cables while not damaging the softer silicone jacket of the cables.

There is a need for a smaller cable clamp that fits within a small frame design where cable routing space is limited. There is also a need for a cable clamp that is easily repositioned or released when desired.

SUMMARY OF THE INVENTION

A cable clamp used to secure at least one cable to a surface in the heavy-duty trucking industry. The cable clamp is formed from two identical cradle halves designed to hold a cable therebetween. Each cradle half has a front, a back, a top, a bottom, and sides. Each cradle half includes at least one cradle portion and an attachment portion. The cradle portion includes a compression insert. The attachment portion has an adjustment latch with a post having a T-shaped head and a tapered adjustment slot. The cable clamp is formed by joining the two cradle halves with the top of one cradle half positioned on the top of a second cradle half, and the cradle portion and the attachment portion of the one cradle half positioned over the cradle portion and the attachment portion of the second cradle half.

BRIEF DESCRIPTION OF THE DRAWINGS

FIG. 1A is a perspective view of a one position cradle half of the present invention.

FIG. 1B is a perspective view of a two-position cradle half of the present invention.

FIG. 12A is a perspective view of the one position cradle half of FIG. 1A with an alternative compression insert.

FIG. 12B is a perspective view of the two-position cradle half of FIG. 1B with an alternative compression insert.

DETAILED DESCRIPTION

The present invention is directed to a cable clamp for holding cables in the heavy-duty trucking industry. The cable clamp can be secured to a surface by a bolt or a nut onto a threaded stud. The cable clamp is formed by joining two identical one position cradle halves 20 or two identical two position cradle halves 220 (see FIG. 10). FIG. 1A illustrates the one position cradle half 20 of the present invention. FIG. 1B illustrates the two-position cradle half 220 of the present invention.

Figure 2:
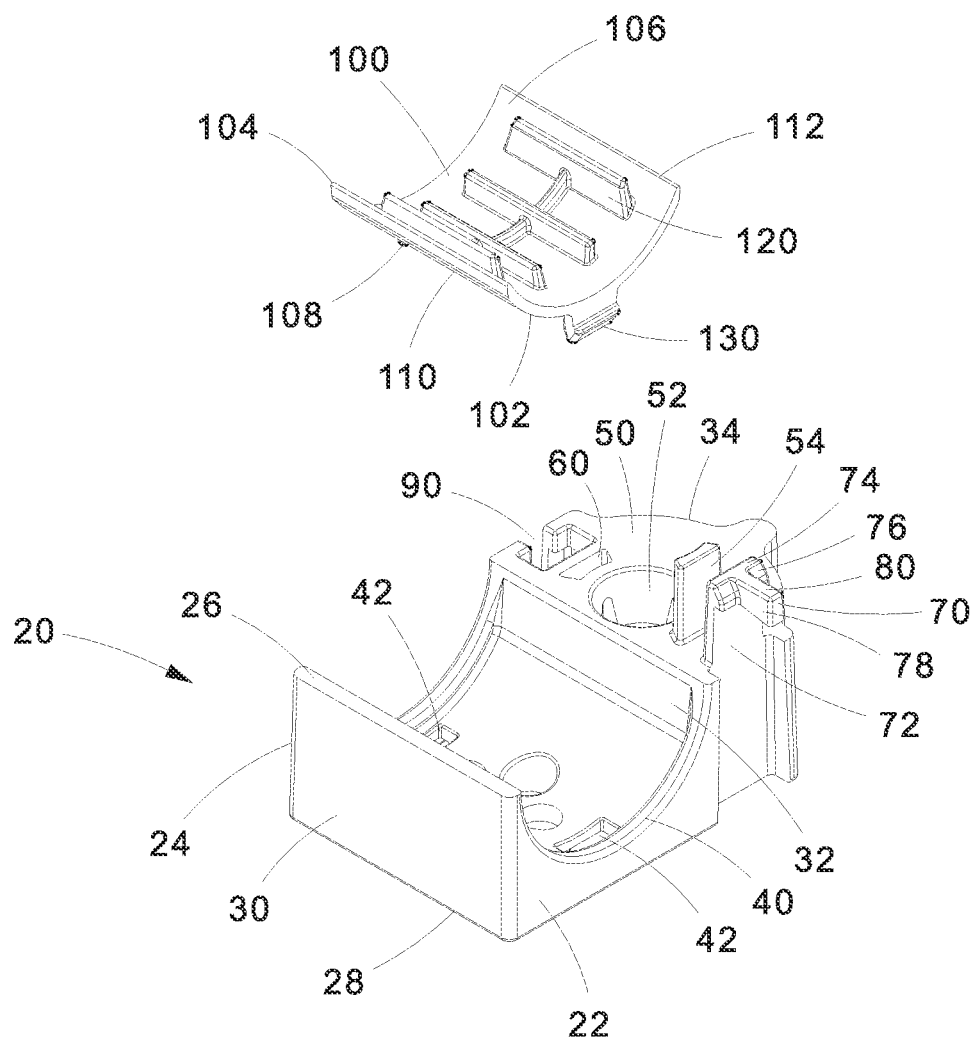
FIG. 2 is an exploded top perspective view of FIG. 1A.

As illustrated in FIG. 2, the one position cradle half 20 includes a front 22, a back 24, a top 26, a bottom 28, a first flat side 30, an inner side 32, and a second curved side 34. The one position cradle half 20 also includes a cradle portion 40 and an attachment portion 50. The cradle portion 40 is defined by the front 22, the back 24, the first flat side 30, and the inner side 32. The cradle portion 40 is semicircular with rectangular openings 42 therethrough. As described below, the rectangular openings 42 are designed to receive snap hooks 130 extending from a compression insert 100.

The attachment portion 50 of the one position cradle half 20 is defined by the front 22, the back 24, the inner side 32 and the second curved side 34. The attachment portion 50 includes a center opening 52 for receiving a fastener (not illustrated), an alignment post 54 positioned on one side of the center opening 52, and an alignment hole 60 positioned on the opposite side of the center opening 52 across from the alignment post 54. The alignment hole 60 complements the shape of the alignment post 54. The front 22 of the attachment portion 50 includes an internal adjustment latch 70. The back 24 of the attachment portion 50 includes an adjustment slot 90.

The adjustment latch 70 includes a post 72 that extends from the top 26 of the one position cradle half 20. The post 72 has a T-shaped head 74 with two catch members 76 and an outwardly extending tab 78. The catch members 76 are positioned on either side of the tab 78. The distal end of the tab 78 is designed to extend through the adjustment slot 90 when the one position cradle halves 20 are joined together to form the cable clamp. As a result, a portion of the tab 78 is accessible outside of the one position cradle half 20. A push pad 80 is positioned on the outer surface of the T-shaped head 74.

The adjustment slot 90 tapers with a wide opening 91 at the top 26 of the one position cradle half 20 to a narrow pathway 92 at the bottom of the adjustment slot 90. The catch members 76 of the T-shaped head 74 are curved to engage the tapered adjustment slot 90 when the adjustment latch 70 slides in the adjustment slot 90. As a result, the adjustment latch 70 becomes captured as it travels in the adjustment slot 90 from the wide opening 91 at the top 26 of the one position cradle half 20 to the narrow pathway 92 at the bottom of the adjustment slot 90.

As illustrated in FIG. 1B, the two-position cradle half 220 includes a front 222, a back 224, a top 226, a bottom 228, a first side 230, a first inner side 232, a second inner side 234, and a second side 236. The two-position cradle half 220 also includes two cradle portions 240, 244 and an attachment portion 250. The first cradle portion 240 is defined by the front 222, the back 224, the first side 230, and the first inner side 232. The second cradle portion 244 is defined by the front 222, the back 224, the second inner side 234, and the second side 236. Each cradle portion 240, 244 is semicircular. The cradle portions 240, 244 also include rectangular openings (not illustrated) that are identical to the rectangular openings 42 in the one position cradle half 20 for receiving snap hooks 130 extending from the compression insert 100.

The attachment portion 250 of the two-position cradle half 220 is defined by the front 222, the back 224, the first inner side 232 and the second inner side 234. The attachment portion 250 includes a center opening 252 for receiving a fastener (not illustrated), an alignment post 254 positioned on one side of the center opening 252, and an alignment hole 260 positioned on the opposite side of the center opening 252 across from the alignment post 254. As in the one position cradle half 20, the alignment hole 260 complements the shape of the alignment post 254. The front 222 of the attachment portion 250 includes an internal adjustment latch 270. The back 224 of the attachment portion 250 includes an adjustment slot 290.

The adjustment latch 270 includes a post 272 that extends from the top 226 of the two-position cradle half 220. The post 272 has a T-shaped head 274 with two catch members 276 and an outwardly extending tab 278. The catch members 276 are positioned on either side of the tab 278. The distal end of the tab 278 is designed to extend through the adjustment slot 290 when the two-position cradle halves 220 are joined together to form the cable clamp. As a result, a portion of the tab 278 is accessible outside of the two-position cradle half 220. A push pad 280 is positioned on the outer surface of the T-shaped head 274.

The adjustment slot 290 tapers with a wide opening 291 at the top 226 of the two-position cradle half 220 to a narrow pathway 292 at the bottom of the adjustment slot 290. The catch members 276 of the T-shaped head 274 are curved to engage the tapered adjustment slot 290 when the adjustment latch 270 slides in the adjustment slot. As a result, the adjustment latch 270 becomes captured as it travels in the adjustment slot 290 from the wide opening 291 at the top 226 of the one position cradle half 220 to the narrow pathway 292 at the bottom of the adjustment slot 290.

The compression insert 100 illustrated in the present invention is a separate molded component. However, the compression insert could also be formed with the one position cradle half 20 or the two-position cradle half 220 by an over molding process. The compression insert 100 is cradle shaped with a front 102, a back 104, a top 106, a bottom 108, a first side 110, and a second side 112. A plurality of ribs 120 extends from the top 106 of the compression insert 100. The ribs 120 run parallel to the sides 110, 112 of the compression insert 100 along with running parallel to the cable that is installed in the one position cradle half 20 or the two-position cradle half 220 (see FIG. 10). The compression insert 100 with the parallel ribs 120 has many benefits compared to a compression insert with ribs that extend perpendicular to the sides of the insert and the cable. The parallel ribs 120 extend the range of cable diameters that can be used with the same cable clamp by providing more deformation within the cable clamp. The extended range of cable diameters reduces the inventory the end user needs to have available. The parallel ribs 120 require less installation force when the assembled cradle halves are being secured to a frame or surface. The parallel ribs 120 also allow easier adjustment of the cables during installation of the one position or two position cradle halves around the cables.

The front 102 and back 104 of the compression insert 100 include snap hooks 130 that extend downwards with the snap hooks 130 extending away from each other. The snap hooks 130 engage the rectangular openings 42 in the cradle portion 40 of the one position cradle half 20 or the rectangular opening (not illustrated) in the cradle portions 240, 244 in the two-position cradle half 220 to secure the compression insert 100 to the cradle halves 20, 220.

Figure 3:
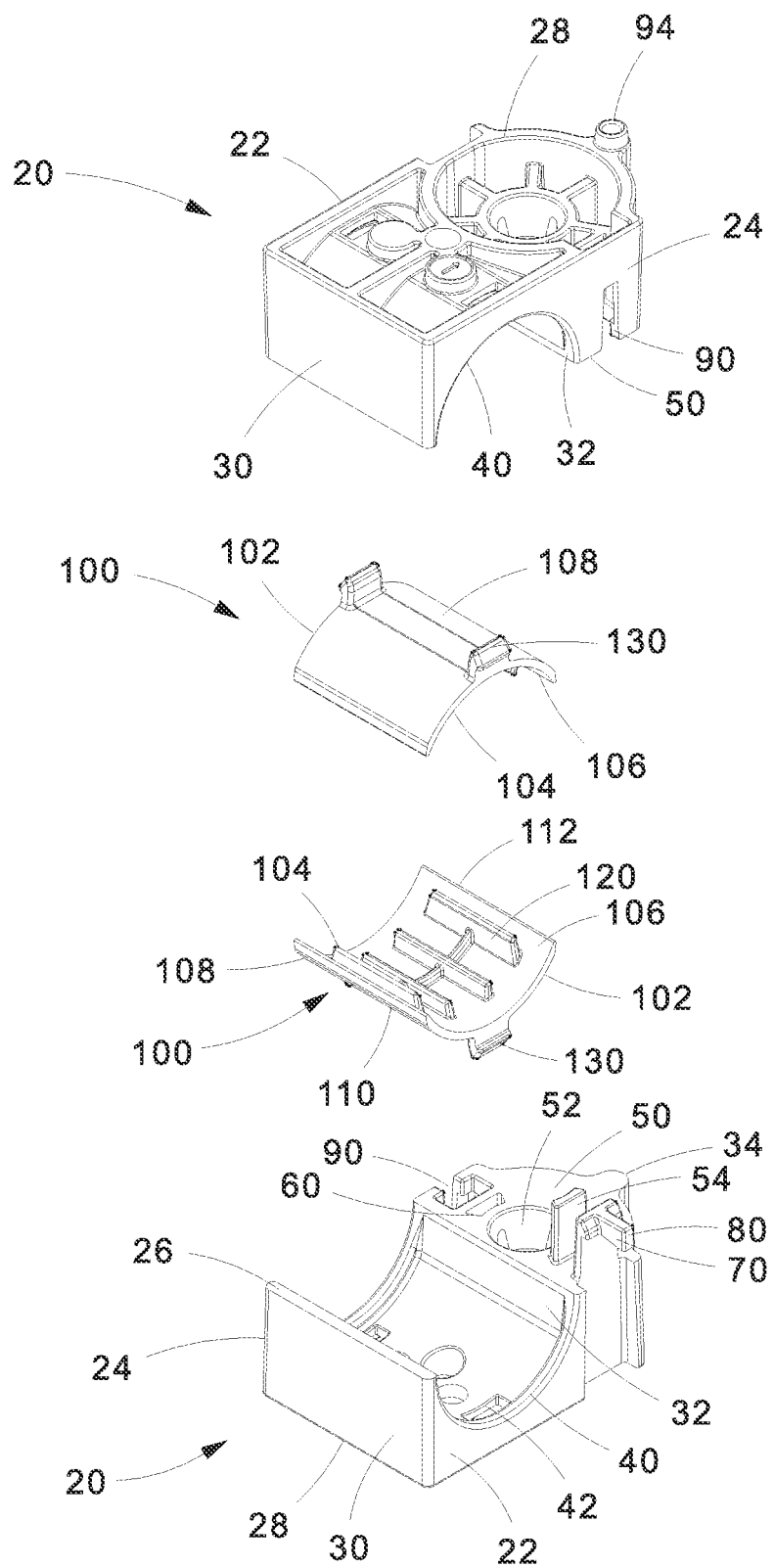
FIG. 3 is an exploded perspective view of a one position cable clamp formed by joining two of the one position cradle halves of FIG. 1A.

The one position cable clamp is formed by joining two one position cradle halves 20 such that the top 26 of each one position cradle half 20 is adjacent each other. FIG. 3 illustrates an exploded view of the one position cradle clamp. The compression inserts 100 are aligned to be positioned within the cradle portion 40 of each one position cradle half 20.

Figure 4:
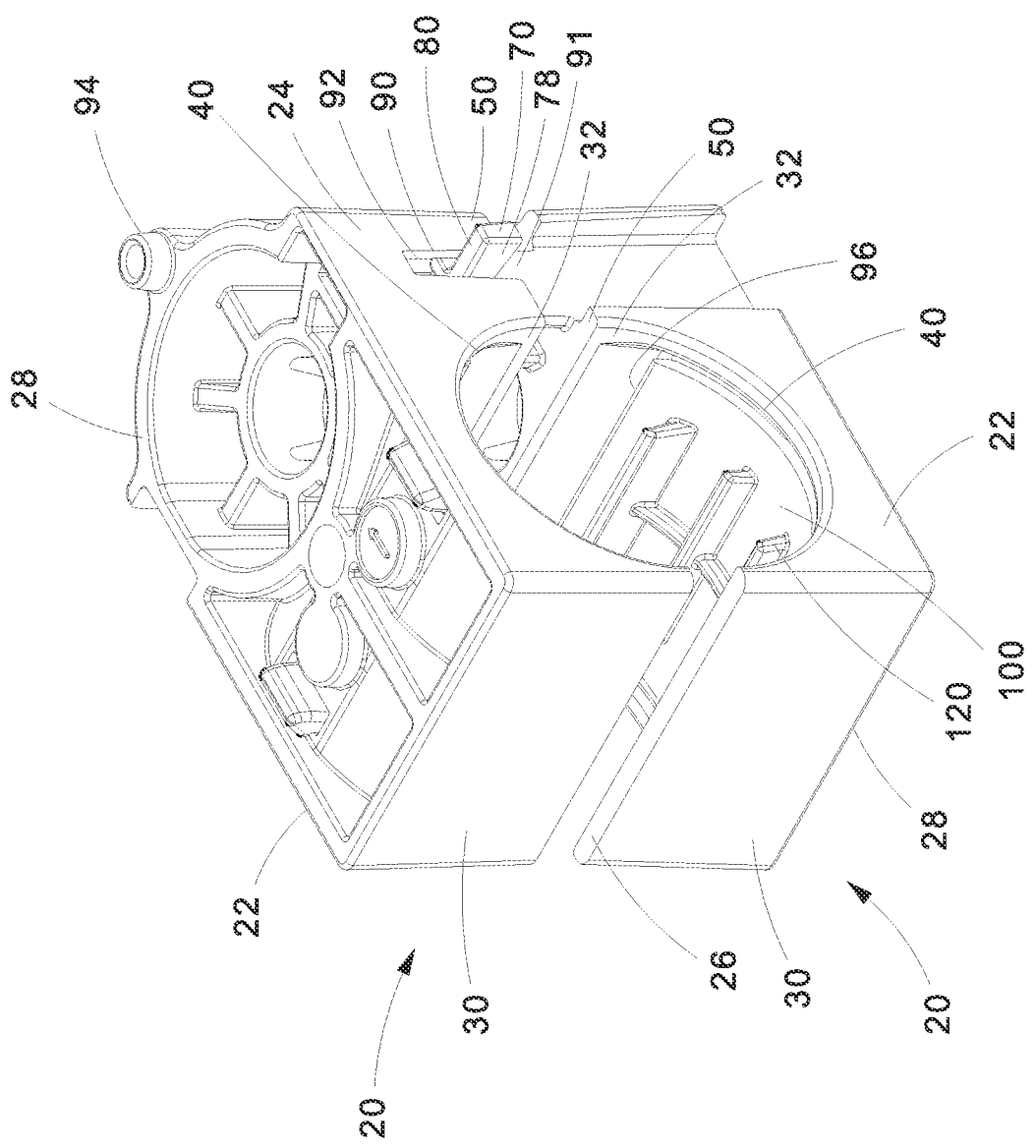
FIG. 4 is a perspective view of the partially assembled cable clamp of FIG. 3 with a first one position cradle half partially secured to a second one position cradle half.
Figure 5:
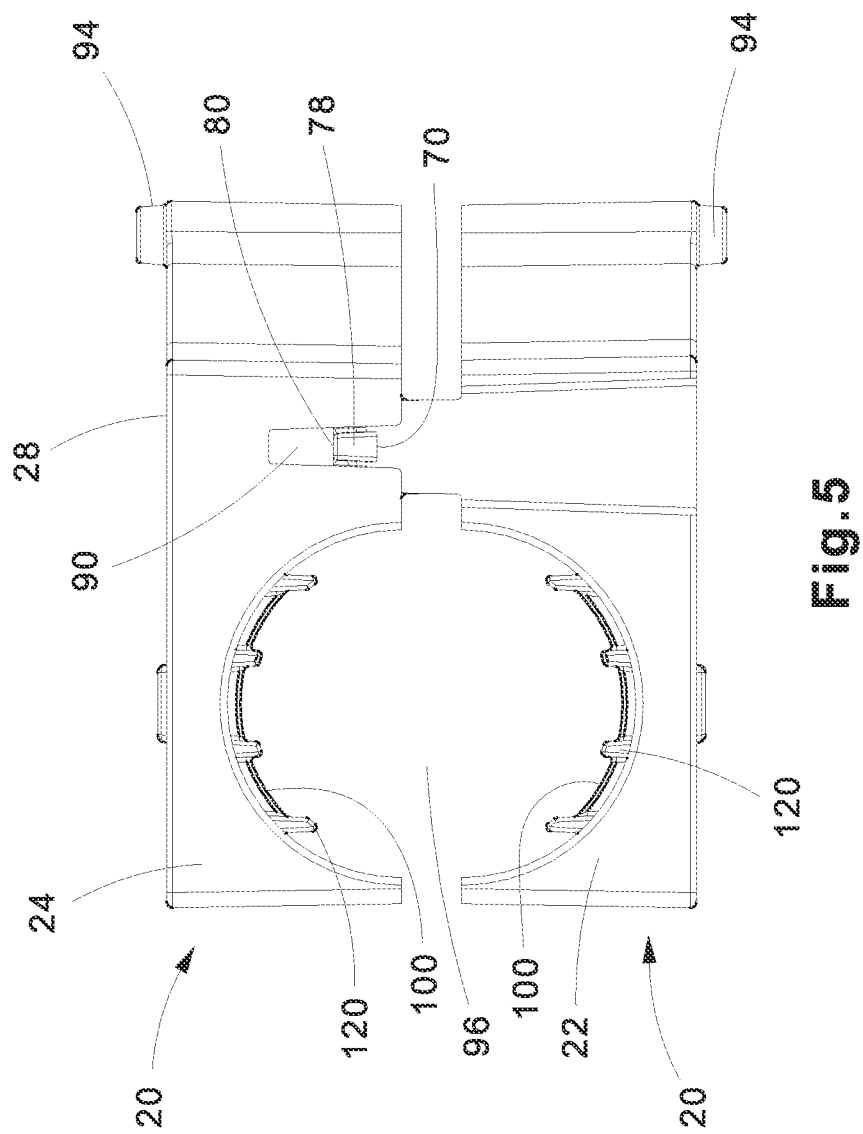
FIG. 5 is a front view of the cable clamp of FIG. 4.
Figure 6:
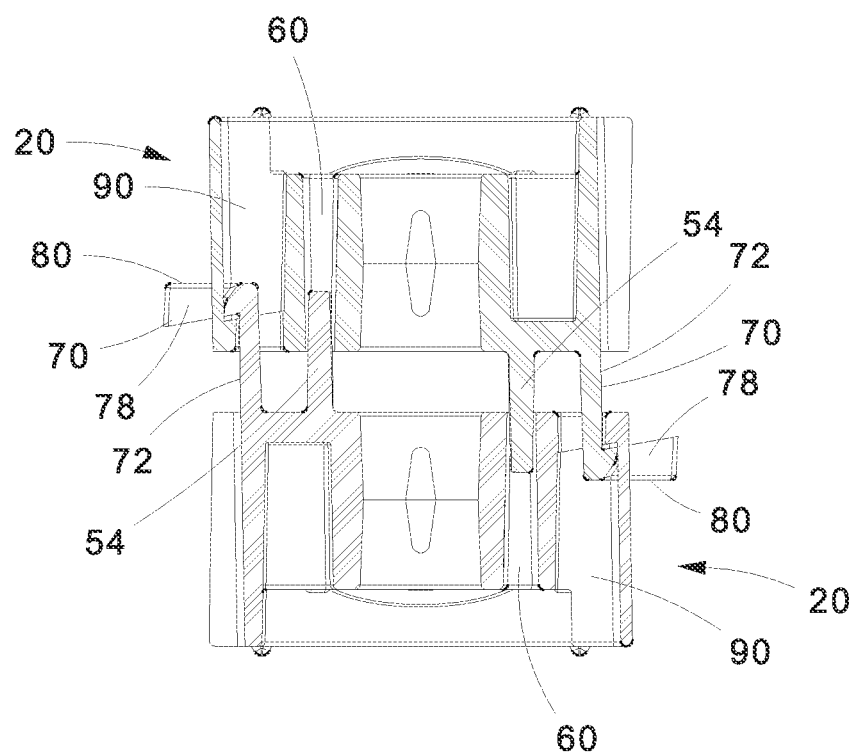
FIG. 6 is a cross sectional view of the cable clamp of FIG. 5.

The cradle portions 40 and the attachment portions 50 are positioned over each other. FIGS. 4-5 illustrate the one position cable clamp partially assembled. As illustrated in FIG. 6, the alignment posts 54 of each one position cradle half 20 are positioned within the alignment holes 60 of the opposite one position cradle half 20. The internal adjustment latches 70 of each one position cradle half 20 are positioned within the adjustment slots 90 of the opposite one position cradle half 20.

The internal adjustment latch 70 has been designed to reduce the force needed to attach the cradle halves 20 to each other to form the cable clamp. The internal adjustment latch 70 will flex and snap into place in the tapered adjustment slot 90 when the two cradle halves 20 are slid together. Once the cradle halves are snapped together around a cable, the internal adjustment latch 70 allows the operator to pull the cradle halves up to 4.5 mm apart while remaining connected. In this position, the cradle halves 20 may be adjusted with respect to each other and the cable positioned therein (not illustrated), if necessary. This allows for a final adjustment of the cradle halves 20 along the cable before bolting the cradle halves together and to a surface for final installation.

Figure 7:
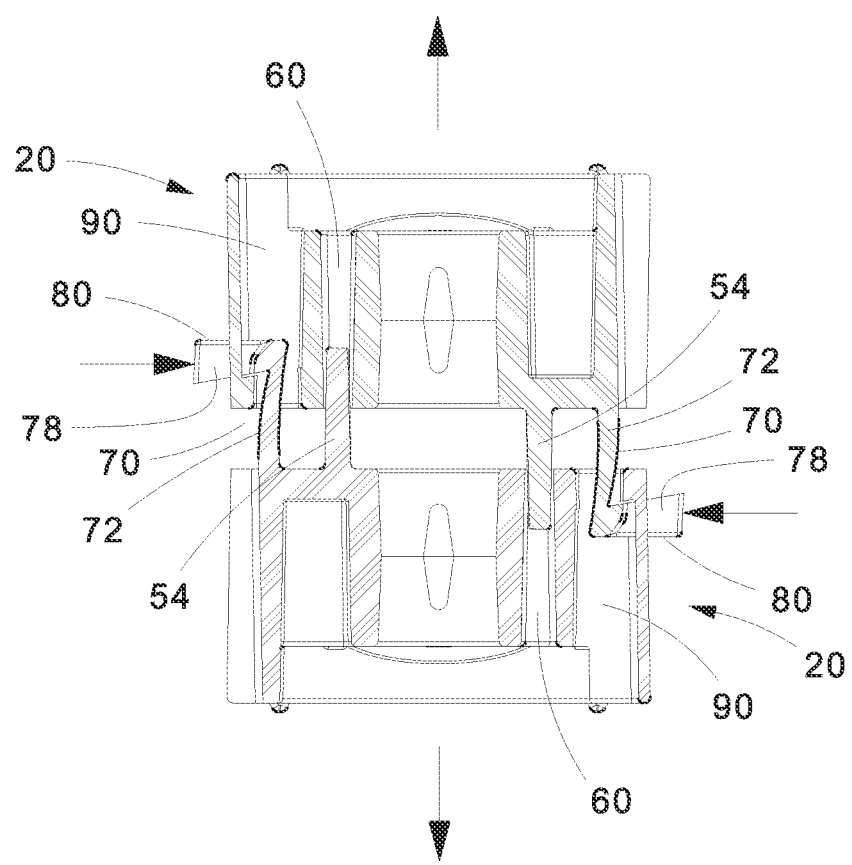
FIG. 7 is a cross sectional view of the cable clamp of FIG. 5 with the latch attachment of each one position cradle half depressed for removal.

As illustrated in FIG. 7, the internal adjustment latch 70 has also been designed to allow the cradle halves 20 to be unattached from each other. The push pad 80 allows for easy removal of the cradle halves 20. The push pads 80 on the T-shaped head 74 of the internal adjustment latches 70 are pressed inward using a thumb and index finger and pulling up on the top one position cradle half 20 to release it from the bottom one position cradle half 20. No tools are required for removing the top one position cradle half 20 from the bottom one position cradle half 20. Additionally, a user can release the cradle halves 20 from each other while wearing heavy insulated gloves as required for safety.

The internal adjustment latches 70 are located at the front 22 and back 24 of the cradle halves 20 to improve the removal process. As a result, the push pad 80 is easily accessible and the cradle halves 20 may be released with only one hand and no tools.

Figure 8:
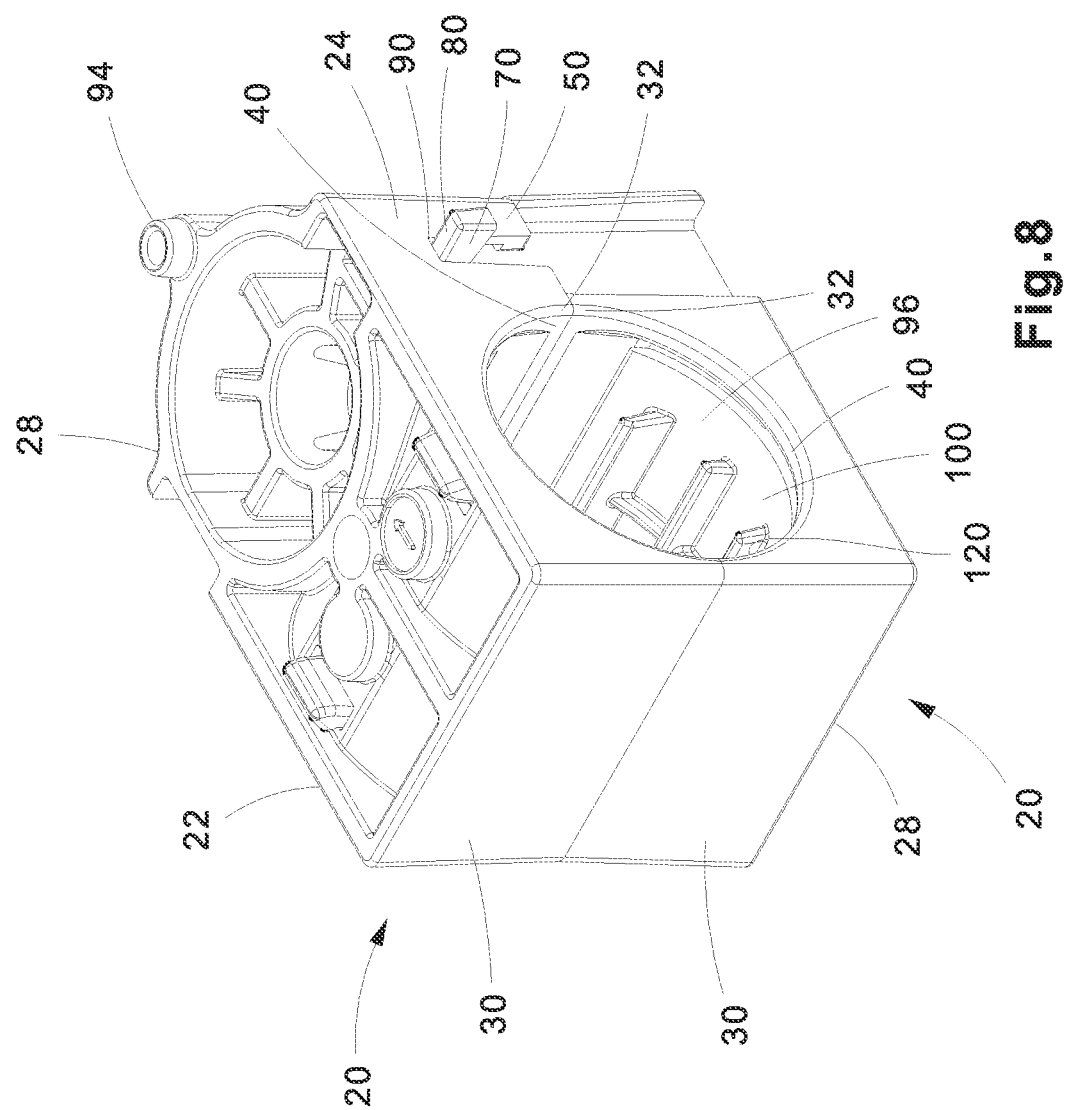
FIG. 8 is a perspective view of the fully assembled one position cable clamp of FIG. 4.
Figure 9:
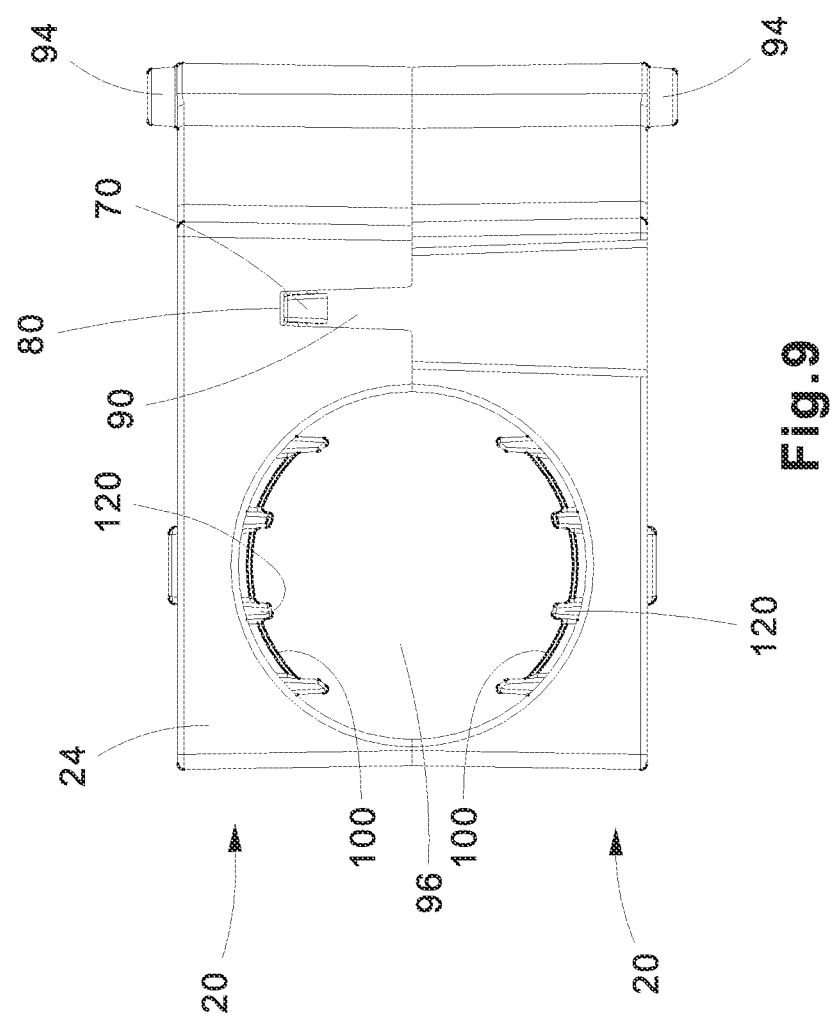
FIG. 9 is a front view of the assembled one position cable clamp of FIG. 8.

FIGS. 8 and 9 illustrate a fully assembled one position cable clamp. As illustrated, the one position cable halves 20 define a passageway 96 for a cable. The bottom 28 of each cradle half includes at least one anti-rotation pad 94. The anti-rotation pad 94 properly positions and secures the cable clamp during installation thereby preventing the one position cradle halves 20 from rotating during installation.

Figure 10:
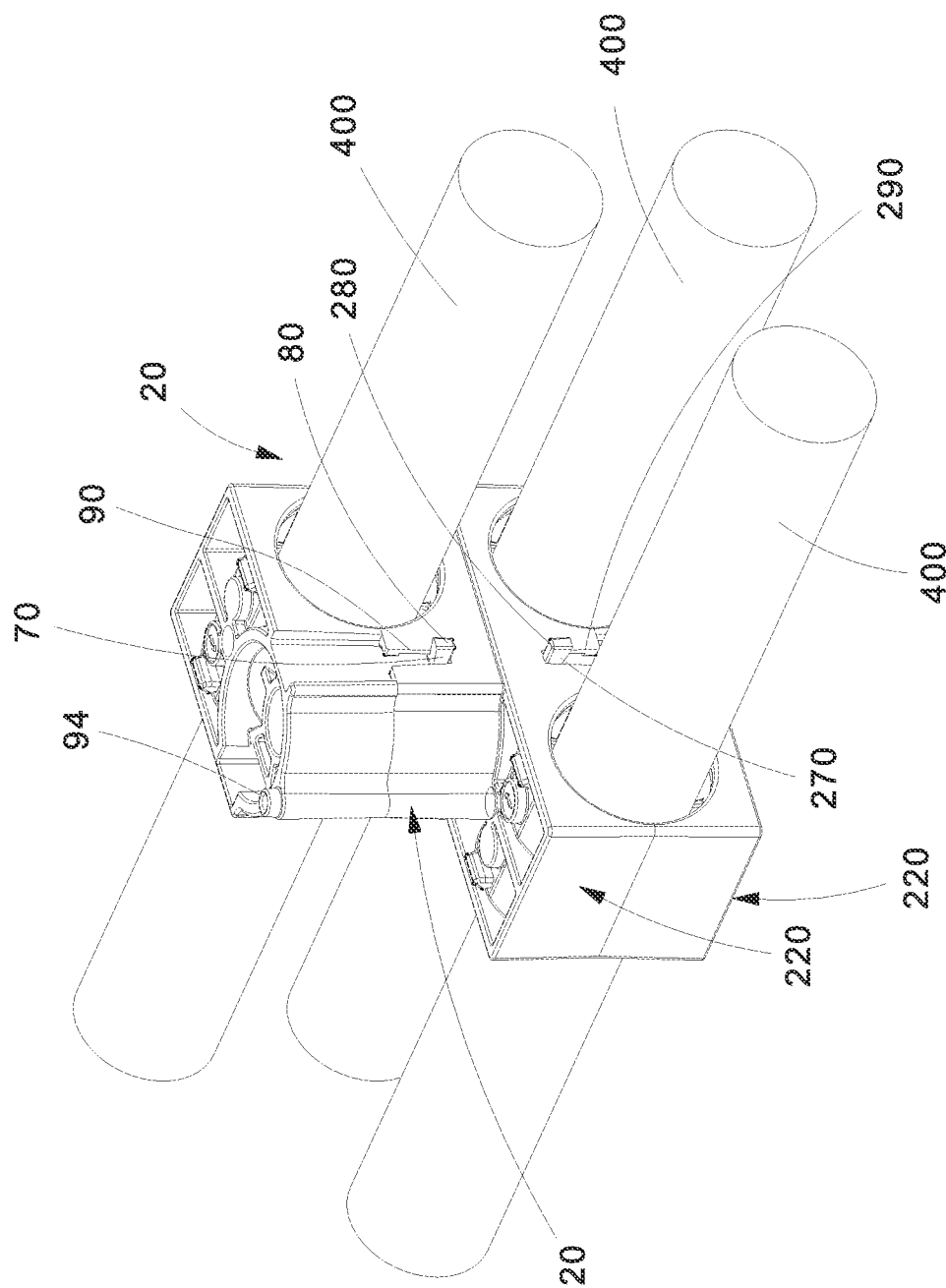
FIG. 10 is a perspective view of the assembled one position cable clamp stacked on top of an assembled two-position cable clamp.
Figure 11:
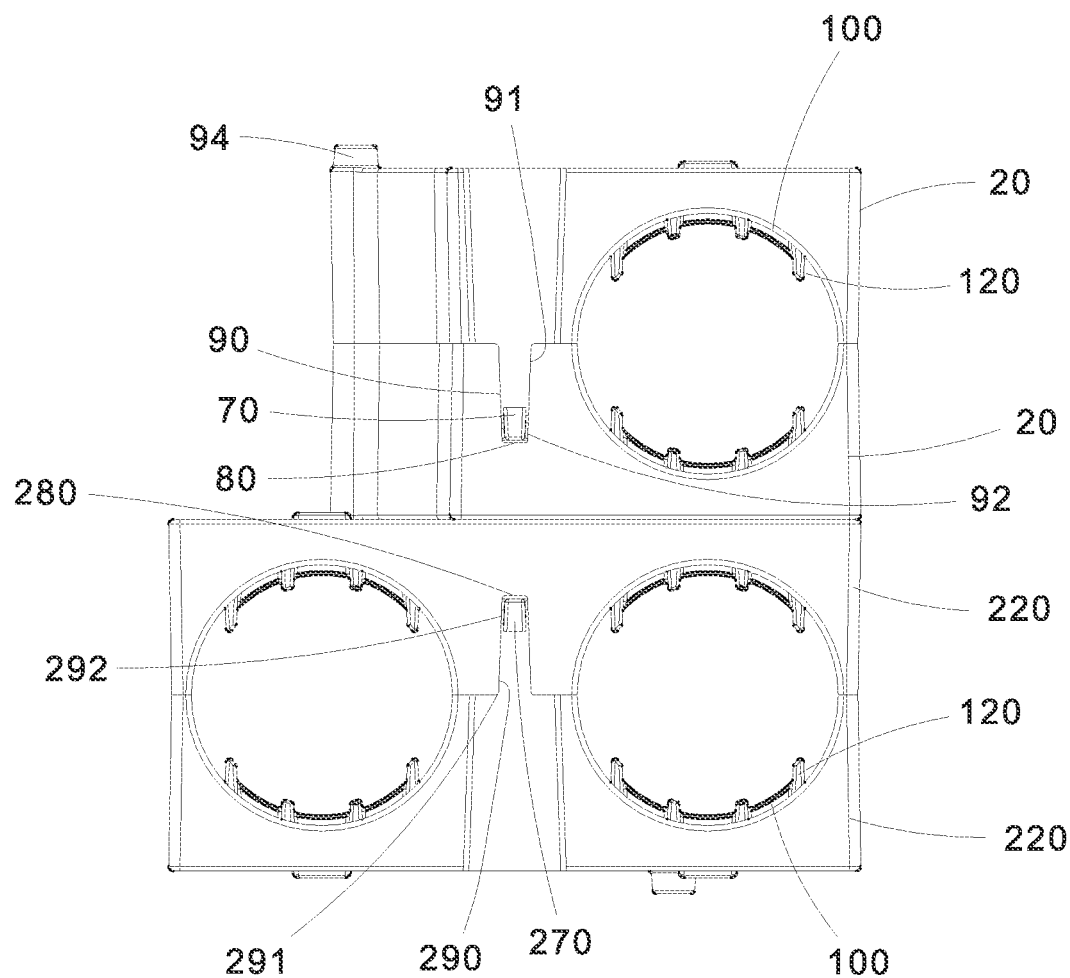
FIG. 11 is a front view of the assembled one position cable clamp stacked on top of an assembled two-position cable clamp of FIG. 10.

FIGS. 10 and 11 illustrate the one position cable clamp stacked on the two-position cable clamp. The anti-rotation pad 94 allows the operator to stack different sized cable clamps. The cradle halves are designed with a specific height that will keep a cable diameter distance between cables when the cable clamps are stacked on one another.

FIGS. 12A and 12B illustrate the one position cradle half 20 and the two-position cradle half 220 with an alternative compression insert 300 installed therein. The alternative compression insert 300 accommodates cables ranging in size from an 11 mm diameter to a 15 mm diameter. The alternative compression insert 300 includes a larger cradle shape and reduces the distance between two smaller cables. The alternative compression insert 300 also includes parallel ribs 320 and snap hooks (not illustrated). The alternative compression insert 300 is snapped in the cradle portion of the one position cradle half 20 or the cradle portions of the two-position cradle half 220 in the same way as described above with respect to the compression insert 100.

Furthermore, while the preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

What is claimed is:

1. A method of assembling a cable clamp around at least one cable, the method comprising:
    providing a first cradle half with a cradle portion and an attachment portion, the attachment portion has an adjustment slot and an adjustment latch with a post having a T-shaped head;
    providing a second cradle half identical to the first cradle half with a cradle portion and an attachment portion, the attachment portion has an adjustment slot and an adjustment latch with a post having a T-shaped head;
    positioning a cable within the cradle portion of the first cradle half;
    positioning the second cradle half over the first cradle half with the cradle portions and the attachment portions of the first cradle half and the second cradle half positioned over each other;
    attaching the second cradle half to the first cradle half by sliding the adjustment latch of the attachment portion of the second cradle half within the adjustment slot of the attachment portion of the first cradle half and sliding the adjustment latch of the attachment portion of the first cradle half within the adjustment slot of the attachment portion of the second cradle half; and
    pulling the first cradle half and the second cradle half partially apart while remaining connected to adjust the cable positioned within the cradle portions.

2. The method of claim 1, wherein the adjustment slot of the attachment portion of the first cradle half is tapered and the adjustment slot of the attachment portion of the second cradle half is tapered.

3. The method of claim 2, wherein the adjustment latches of the attachment portions flex and snap into place in the tapered adjustment slots when the cradle halves are slid together.

4. The method of claim 1, wherein after adjusting the cradle halves and the cable positioned therein, bolting the cradle halves together and to a surface for final installation.

5. The method of claim 1, wherein the attachment portion of the first cradle half has an alignment hole and an alignment post and the attachment portion of the second cradle half has an alignment hole and an alignment post, whereby the alignment post of the attachment portion of the second cradle half is positioned within the alignment hole of the attachment portion of the first cradle half and the alignment post of the attachment portion of the first cradle half is positioned within the alignment hole of the attachment portion of the second cradle half.

6. The method of claim 1, providing the cradle portion of the first cradle half with a compression insert and providing the cradle portion of the second cradle half with a compression insert.

7. The method of claim 1, further comprising a step of engaging the adjustment latches to enable the cradle halves to be unattached from each other for repositioning along the at least one cable.

8. The method of claim 7, wherein the adjustment latch is pressed inward and the second cradle half is pulled up to release the second cradle half from the first cradle half.

9. The method of claim 8, wherein removing the second cradle half from the first cradle half without the use of a tool.

10. The method of claim 1, wherein the T-shaped head of the adjustment latch of the first cradle half has two catch members and an outwardly extending tab, wherein the catch members are positioned on either side of the outwardly extending tab; and the T-shaped head of the adjustment latch of the second cradle half has two catch members and an outwardly extending tab, wherein the catch members are positioned on either side of the outwardly extending tab.

* * * * *